United States Patent [19]

Halavais

[11] Patent Number: 4,819,053
[45] Date of Patent: Apr. 4, 1989

[54] SINGLE-POINT LOCATING SYSTEM

[76] Inventor: Richard A. Halavais, 3815 N. 28 St., Phoenix, Ariz. 85016

[21] Appl. No.: 39,973

[22] Filed: Apr. 17, 1987

Related U.S. Application Data

[63] Continuation-in-part of Ser. No. 880,705, Jul. 1, 1986, abandoned, which is a continuation-in-part of Ser. No. 861,369, May 9, 1986, abandoned.

[51] Int. Cl.⁴ ............................................. H04B 7/185
[52] U.S. Cl. .................................. 342/353; 342/354; 342/357; 342/158
[58] Field of Search ............... 342/353, 354, 355, 356, 342/357, 157, 158, 457

[56] References Cited

U.S. PATENT DOCUMENTS

| | | | |
|---|---|---|---|
| Re. 26,680 | 10/1969 | Rosen | 342/354 |
| 2,605,418 | 7/1952 | Grass | 342/158 X |
| 2,692,985 | 10/1954 | Fetheroff | 342/158 X |
| 3,063,048 | 11/1962 | Lehan et al. | |
| 3,242,494 | 3/1966 | Gicca | |
| 3,434,142 | 3/1969 | Andre et al. | 342/354 |
| 3,440,635 | 4/1969 | Hull | |
| 3,702,477 | 11/1972 | Brown | |
| 3,703,714 | 11/1972 | Andrews | |
| 3,786,413 | 1/1974 | Ross et al. | |
| 3,789,409 | 1/1974 | Easton | |
| 3,795,896 | 3/1974 | Isaacs | |
| 3,852,750 | 12/1974 | Klein | |
| 3,852,763 | 12/1974 | Kreutel, Jr. et al. | |
| 3,893,069 | 7/1975 | Mason | |
| 3,906,204 | 9/1975 | Rigdon et al. | |
| 3,941,984 | 3/1976 | Chappell et al. | |
| 3,949,400 | 4/1976 | Shores | 342/356 |
| 4,012,728 | 3/1977 | Fowler | |
| 4,114,155 | 9/1978 | Raab | |
| 4,161,730 | 7/1979 | Anderson | |
| 4,177,466 | 12/1979 | Reagan | |
| 4,188,614 | 2/1980 | Habib, Jr. | |
| 4,260,982 | 4/1981 | DeBenedictis et al. | |
| 4,276,553 | 6/1981 | Schaefer | |
| 4,359,733 | 11/1982 | O'Neill | |
| 4,383,242 | 5/1983 | Sassover et al. | |
| 4,445,118 | 4/1984 | Taylor et al. | |
| 4,523,178 | 6/1985 | Fulhorst | |

Primary Examiner—Theodore M. Blum
Assistant Examiner—Mark Hellner
Attorney, Agent, or Firm—Leonard Tachner

[57] ABSTRACT

A locating system employs a single-point device employing unique scanning patterns for generating peak signal data which can be used to calculate the position of a signal source within a scanned region. One preferred embodiment utilizes a satellite in high earth geosynchronous orbit and a simultaneous yaw and roll pattern to scan a substantial portion of the earth's surface. The point source being located may be virtually any form of transmitter of radiant energy such as infrared, electromagnetic, light or acoustical energy. The scanning device may also be positioned in a low earth orbit satellite, an aircraft, a missile or a helicopter. The single-point device re-radiates the signal source transmission to a computer command center which correlates single-point device scanning position data with received transmissions to accurately compute the location of the signal source. Beacons placed at precisely known locations may be used to interpret scan data. The computer triangulates peak signals of multiple roll orbits generated during each yaw orbit of the single-point device to determine the precise location of the source. The computer may also search a data base to identify the signal source and provide related information previously stored in the data base. The invention is particularly advantageous for locating stolen vehicles and for finding kidnapped persons. The system may also be used for determining altitude of a signal source that may, for example, be located on an aircraft in flight.

29 Claims, 10 Drawing Sheets

SINGLE-POINT LOCATING SYSTEM

CORRESPONDING APPLICATION

This application is a continuation-in-part of U.S. application Ser. No. 880,705 filed July 1, 1986, abandoned, which, in turn, is a continuation-in-part of U.S. application Ser. No. 861,369 filed May 9, 1986, abandoned.

BACKGROUND OF THE INVENTION

1. Field of the Invention

The present invention relates generally to radiation-based two-dimensional and three-dimensional locating systems and more specifically, to a single-point locating system which in one preferred embodiment utilizes a satellite in geosynchronous orbit scanning a preselected region on the earth's surface in a simultaneous yaw and roll pattern for precisely locating a point source of energy. Such device can be used to find lost or stolen items or to provide position information for navigation systems. It can also be used to provide location information to trucking and shipping companies, taxicab companies, airlines, bus and train companies, construction companies, surveyors and the like. It can also be used to determine the exact present position of any person or thing on which a suitable transmitter is located. Thus, the present invention can help in finding lost or kidnapped children. It can be used as means for instant communication of auto accidents or road emergencies as well as portable security devices for travelers, hikers, joggers and the like. A passive receiver-calculator version can be used to determine precise local position based upon peak detection of satellite down-link scanned transmission. As used herein the "peak signal detection" includes other signal direction detection means.

2. Prior Art

The need for a reliable means for quickly and accurately locating the position of an object or person has long been recognized. In emergency situations such as shipwrecks, aircraft crashes or automobile accidents, the ability to quickly and accurately determine location is often a life and death matter. When a child is lost or has been kidnapped, fast and accurate location of his whereabouts is equally a life and death situation. Furthermore, for the elderly or infirm, the means of instantly communicating their exact present location in the event of a medical or other emergency returns to them the freedom to travel and independence. To the dispatcher of a taxicab company, instant knowledge of the exact location of each cab in the fleet allows him the time and cost savings of directing the nearest taxicab in his fleet to respond to a call from a customer. Of course, such time and cost savings can be realized in analogous service industries such as high speed delivery services and the like. A reliable and accurate locating system when used on aircraft offers aircraft collision avoidance as well as superior navigational information allowing straight line flight to any destination thereby saving both time and fuel. Upon approach to an airport, aircraft can utilize the added accuracy of such a navigational capability to provide instrument landing systems at any airport rather than the limited number of airports now offering such capability. The same advantages can be used on ships for allowing lower cost and great flexibility in scheduling due to the time savings of straight line navigation over long distances. In military applications, the exact position of troops and vehicles can prove vital to the battlefield commander. The ebb and flow of the battle can be instantly seen in real time presentations of troop and armament locations. For diplomats in hazardous areas, a precise and portable location system offers a means of security in the event terrorist activity results in taking hostages. The chance for successful rescue is greatly improved by knowing the exact present location of the hostage. Such locating devices may also be advantageously used in security systems such as car alarms.

Prior art attempts to provide fast, accurate location information suffer major limitations including high cost, complexity, inaccuracy, large size and weight and limited operating range. Relevant prior art includes the following:

3,063,048: Lehan et al
3,242,494: Gicca
3,440,635: Hull
3,702,477: Brown
3,703,714: Andrews
3,786,413: Matthews
3,789,409: Easton
3,795,896: Issacs
3,852,750: Klein
3,852,763: Kreutel Jr. et al
3,893,069: Mason
3,906,204: Rigdon et al
3,941,984: Chappell et al
4,012,728: Fowler
4,114,155: Raab
4,161,730: Anderson
4,177,466: Reagan
4,188,614: Habib Jr.
4,260,982: DeBenedictis et al
4,276,553: Schaefer
4,359,733: O'Neill
4,383,242: Sassover et al
4,445,118: Taylor et al
4,523,178: Fulhorst U.S. Pat. No. 3,063,048 to Lehan et al is directed to a discovery and location system which utilizes a single satellite for determining the position of a vehicle. The transmitter provides for a continuous wave signal to the satellite. However, the satellite is not stationary and as it approaches and recedes, the frequency of the signal received by the satellite changes due to the Doppler effect. When the satellite is closest to the object, the frequency of the received signal decreases at a maximum rate. Within the satellite, a phase-lock loop locks a variable frequency oscillator to the incoming signal. The output of the variable frequency oscillator is then beat against the output of a crystal oscillator to produce an audio beat signal whose frequency varies in a similar manner when taken with respect to the incoming signal.

U.S. Pat. No. 3,440,635 to Hull is directed to a police alarm-type system which provides for a transmitter to be carried on a person. In this reference the inventor uses a portable alarm transmitter carried by the person in order to signal a central location such as a police station by employing direction finders at two of the stations in a simultaneous manner. The capability of determining the origin of the alarm signal from the transmitter is provided and the person sending the signal may be located.

U.S. Pat. No. 3,703,714 to Andrews is directed to a remote alarm system that transmits an alarm signal to a displaced receiver when there is an unauthorized access made into a vehicle. This system includes a portable remote transceiver which transmits and receives signals. There is a vehicle mounted radio transceiver which is both operatively tuned to receive and to transmit to the remote transceiver. The remote transceiver further includes a means whereby a signal may be sent from the transceiver back to the vehicle transceiver to actuate some alarm system on the vehicle if so desired.

U.S. Pat. No. 3,852,750 to Klein is directed to a navigation satellite system. However it uses a plurality of synchronous satellite relays in order to determine the position of various earth bound vehicles. Three synchronous satellites are used alternatively to relay radio frequency carrier amplitude modulated signals with a multiplicity of low frequency tones. Each of the vehicles has a communication receiver including an amplitude modulated detector and a position location system. The amplitude modulated detected output of the communications receiver is coupled to the position location systems and determines the position of the vehicle from the relative phases of the low frequency tones.

U.S. Pat. No. 3,893,069 to Mason discloses a vehicle alarm system for alerting an owner of an unauthorized entry to his vehicle. The system includes a transmitter/receiver which may be in the form of a walkie-talkie unit. The owner of the vehicle may be in the range of the transmitter and is warned when anyone tampers with the vehicle through activation of a plurality of compartments which is what activates the transmitter when any of each of those switches is closed. Thus, this patent discloses the general concept of alerting a vehicle owner or user at a remote location that his vehicle is being tampered with.

U.S. Pat. No. 3,906,204 to Rigdon et al discloses a satellite positioning system to determine the position of any type of vehicle on the earth's surface by processing signals sent from the satellite. However, this is not a stationary satellite and the positioning is based on the Doppler shift in frequencies of the signals sent to the satellite in combination with the orbit description data encoded in the signals.

U.S. Pat. No. 4,177,466 to Reagan discloses an auto theft detection system where there is provided a transmitter adapted to broadcast a call signal through an antenna. An encoder is coupled to the transmitter and modulates the call signal to specify which one of many automobiles the call is directed to. The vehicle may then broadcast a locator signal when queried from a central station. Indicators are provided and are responsive to the location signal to determine the location of the possibly missing vehicle.

U.S. Pat. No. 4,276,553 to Schaefer is directed to a system for determining the position of the radiant energy source from a geostationary, synchronous satellite. The system and method are provided by scanning the beam of a narrow beamwidth antenna in first and second normal directions over a predetermined region which includes the source. The high level of energy transduced by the antenna in each of the scanning directions is detected and correlated with the scanning position of the beam by feeding the output of a detector to a recorder. Despite the fact that the satellite is stationary, it must utilize a plurality of earth stations to hone in on the target.

U.S. Pat. No. 4,445,118 to Taylor et al is directed to a navigation system which utilizes a geostationary satellite in combination with a global positioning system comprising a plurality of satellites. The position coordinates of various vehicles and other sources on the earth's surface is provided by processing a plurality of signals transmitted by the multiplicity of orbiting satellites in the global positioning system. An acquisition aiding signal generated by a control station is relayed to the various user terminals through the geostationary satellite.

None of the aforementioned prior art or any other prior art known to the applicant, discloses a locating system utilizing a single-point satellite or other such platform cooperating with a single ground station for accurately determining the precise location of a signal source. None of such prior art or any other prior art known to the applicant discloses a locating system utilizing a single platform such as a high earth geosynchronous satellite which scans through a combined yaw and roll pattern to generate location information for accurately determining the precise location of a source of radiant energy. Furthermore, no prior art known to the applicant utilizes a single-point satellite-based transmitter having a precisely known antenna scanning pattern to provide local position assessment capability by means of a passive receiver-calculator. Furthermore, no prior art known to the applicant provides a three-dimensional locating capability utilizing a single satellite system.

SUMMARY OF THE INVENTION

The locating system of the present invention, in one particular embodiment thereof, includes a radio transmitter located on or attached to the object to be located. Such transmitter broadcasts over a selected frequency on command of either some detection device and/or an initiation signal from a command center on one or more frequencies. The system further comprises a satellite in a geosynchronous high earth orbit to which a scanning motion in roll and yaw has been imparted. By such motion the scanning describes a search pattern of the entire visible face of the earth. The satellite comprises a narrow beamwidth antenna (i.e. $\frac{1}{4}$ degree in one direction) receiving the signal from the earth station radio transmitter only at those combinations of yaw and roll wherein lines of triangulation pass through the target and a radio receiver tuned to receive the frequency or frequencies transmitted by the radio transmitter located on or attached to the object to be located.

The satellite further comprises a radio transmitter wherein the signal received from the earth station transmitter is relayed to a command center where by triangulation, the exact location of the object to be located is determined. In other embodiments the satellite of the present invention comprises a narrow bandwidth monitor or detecting device such as an infrared detector or the like wherein detection occurs only at those combinations of yaw and roll wherein lines of triangulation pass through the target. Such a satellite further comprises a radio transmitter relaying a signal to a command center where through triangulation the exact location of the object or occurrence is determined. Although in a particular preferred embodiment herein disclosed, the scanning platform for relaying the signal source transmission to the command center is located on a satellite in geosynchronous high earth orbit, the elements of the present invention may be readily utilized on platforms located in alternative locations such as low earth orbit, airplanes, helicopters, hilltops and the like. Furthermore, although the preferred embodiment utilizes a satellite where scanning is accomplished by means of satellite motion in yaw and roll, it will be readily apparent to those having skill in the art to which the present invention pertains that such scanning may be achieved entirely by electronic means such as by means of a phased array antenna or by means of a mechanically movable antenna which is connected to an otherwise stationary platform.

The earth station transmitter portion of the present invention may be provided in the form of a relatively simple portable transmitter capable of transmitting upon command at a selected frequency and relatively low power, a preselected coded signal which conveys to the satellite or other platform, information identifying the source of the transmission. Furthermore, the satellite or other platform portion of the present invention may be also of relatively simple implementation because the platform's function is simple. More specifically, the function of the platform is merely to relay the received signal transmission either directly or indirectly to a single-point ground station or alternatively, simply generate a radio frequency transmission in response to the detection of various forms of radiant energy. The ground station of the present invention comprises a suitable antenna capable of receiving the satellite-generated signal, a receiver for processing the signal and a computer for utilizing the data carried by such a signal.

Although the present invention may be utilized in a virtually unlimited number of applications, one particularly advantageous application of the present invention is its use in mobile security systems such as car alarms. It is well-known that a major limitation in car alarms is the lack of a guaranteed response to the triggering of the alarm. Typically, the response if any depends upon someone noticing the sound of a horn or the flashing of headlights and then taking the time to phone the police with a report. The present invention provides both a signal through the satellite and the exact location of the vehicle so that a receiving command center can provide positive guarantee of notification of the intrusion as well as the exact location to proper authorities. In such an application the transmitter portion of the present invention may be located in the vehicle and provided with a digital keyboard and other secure means for assuring that only the authorized operator of the vehicle has gained entrance and access to the vehicle. Otherwise the system may be automatically initiated for generating a suitable location and identifying transmission to the platform such as a satellite of the present invention, such transmission ultimately being received by the ground station which can pinpoint the present location of the vehicle and notify authorities not only that the vehicle has been stolen but also where they may find the vehicle and recover same for the owner.

A second embodiment utilizes the same scanning pattern but passive receiver-calculators instead of uplink transmitters to permit individual local position determination without the aid of a ground-based command center. Each such receiver-calculator is designed to correlate peak-signal detection with yaw and roll data from the satellite transmitted signal and to calculate local position based upon multiple correlations. The method of position calculation for this second calculation is essentially identical to that employed in the command center of the first embodiment. As used herein, the term "peak signal detection" includes peak signal strength detection as well as averaging of first and last signal acquisition, counting and averaging all signal acquisition and any other means for identifying the direction of maximum signal strength.

It will be seen hereinbelow that the present invention may be readily used for locating point targets in three-dimensions. As a result, the precise location and altitude may be determined using only a single satellite or other platform. Such capability should prove extremely advantageous for aircraft navigation and tracking. A precision three-dimensional locating capability may also find advantageous application in the automated tracking and control of aircraft for both civilian and military purposes.

OBJECTS OF THE INVENTION

It is therefore a primary object of the present invention to provide a locating system of exceptional accuracy.

It is a further object of the present invention to provide a locating system which is relatively simple and inexpensive and which utilizes a radiant energy transmitter of sufficiently small size to be portable to the user.

It is still a further object of the present invention to provide a locating system which has worldwide range.

It is still a further object of the present invention to provide a locating system which operates in essentially real time.

It is still a further object of the present invention to provide a locating system capable of carrying a message to off the user a means for communicating an emergency status either actively or passively to a command center where appropriate help can be dispatched or so that other messages to and between users may be sent and received.

It is still a further object of the present invention to provide an alarm system for mobile applications where an unauthorized intrusion of a vehicle or other object initiates guaranteed response to the exact location by the proper authorities.

It is still a further object of the present invention to provide a means for remotely monitoring various types of mechanical devices or chemical processes or the like and which assures proper intervention upon receipt of a signal identifying an anomalous condition.

It is still a further object of the present invention to provide a means for generating an intrusion alarm at locations remote from telephone communications or where factors make the use of a satellite-based system more desirable to the user.

It is still a further object of the present invention to provide a local position calculating capability in a ground-based receiver utilizing satellite roll and yaw data on a signal received from a scanning satellite-based transmitter.

It is still a further object of the present invention to provide a three-dimensional locating system utilizing a single satellite and which may be used for determining the precise position and altitude of aircraft.

BRIEF DESCRIPTION OF THE DRAWINGS

The aforementioned objects and advantages of the present invention as well as additional objects and advantages thereof will be more fully understood hereinafter as a result of a detailed description of a preferred embodiment when taken in conjunction with the following drawings in which.

DETAILED DESCRIPTION OF PREFERRED EMBODIMENTS

Figure 1:
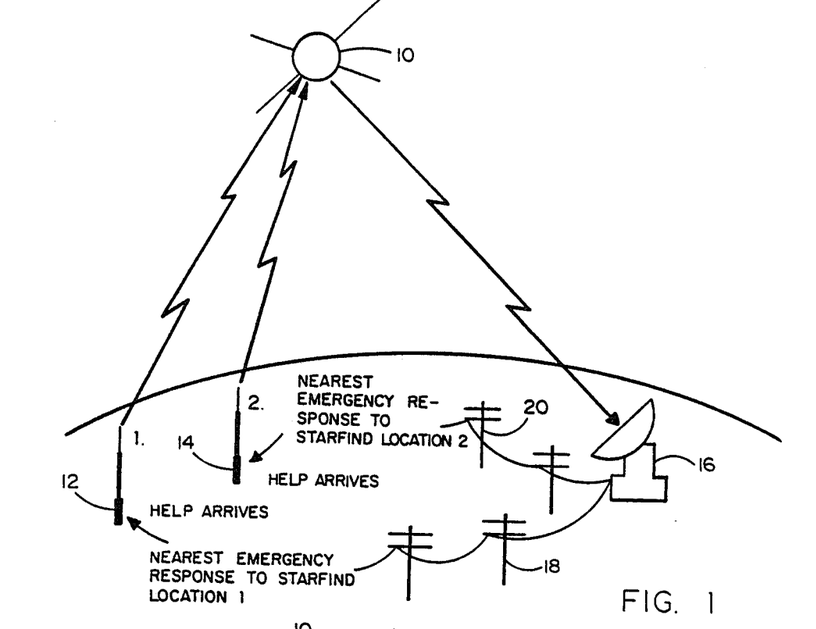
FIG. 1 is a schematic illustration of the concept of the present invention utilizing a single-point satellite.

Referring first to FIG. 1, it will be seen that the satellite embodiment of the present invention may be configured to provide a means for alerting local authorities to respond to some form of emergency associated with a signal source transmission located by the platform of the present invention. In this configuration the invention comprises a satellite 10, a plurality of sending units 12 and 14, a ground station 16 and a plurality of land line communication links 18 and 20. The concept of the invention illustrated in FIG. 1 comprises a closed loop/gauranteed response to a signal from a user. For simplicity of illustration, only two signal source sending units are shown but obviously many more users may access the system simultaneously. The sending units, that is, the transmitters of the signal source to be located by the satellite 10 in conjunction with ground station 16, may of course serve numerous locating purposes. By way of example, one such sending unit may be used in a vehicle and provided with means for automatically transmitting an appropriate signal in the event the vehicle is accessed or moved from its location by unauthorized persons. Alternatively, the sending unit may be initiated or activated by a driver or passenger who may be in distress and require assistance. Another such sending unit may be utilized by a person in a wheelchair needing emergency medical assistance. Both sending units 12 and 14 transmit a radio signal which is received by the satellite 10 of the present invention which may, by way of example, be positioned in geosynchronous earth orbit. Satellite 10 relays the signal transmitted by either or both sending units 12 and 14 to the ground station 16. The ground station comprises a computer and a command center where the information contained in the signal is processed and an appropriate response is directed through land line communication links 18 and/or 20 to alert the nearest appropriate response center such as a hospital, the auto club or a police department.

Figure 2:
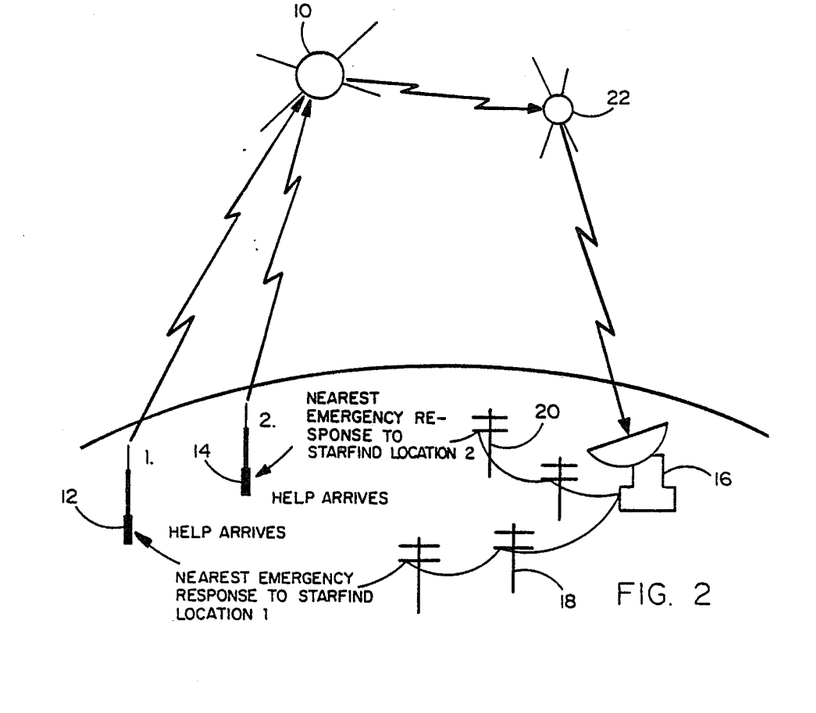
FIG. 2 is a schematic illustration of an alternative concept of the present invention utilizing a single-point satellite for locating and a second satellite for re-transmission to an earth station.

The concept of the present invention illustrated in FIG. 2 is essentially identical to that illustrated in FIG. 1 with one exception, that exception is the inclusion of a commercial communications satellite 22 which is also in geosynchronous earth orbit. In the configuration illustrated in FIG. 2, satellite 10, instead of relaying the ground-based signal directly to a ground station 16, relays the signals to a commercial communications satellite 22 which then in turn relays the signal to the ground station 16. Commercial communication satellite 22 does not form a part of the present invention and in fact, its inclusion in FIG. 2 is merely intended to illustrate that the locating system of the present invention may be readily configured to take advantage of available communication channels in nearby geosynchronous commercial satellite to optionally reduce the transmission of the satellite portion of the present invention. It is to be understood however that the operation of the present invention is not dependent upon access to such nearby commercial geosynchronous satellites and accordingly, the present invention should not be deemed to be limited in that regard.

Figure 3:
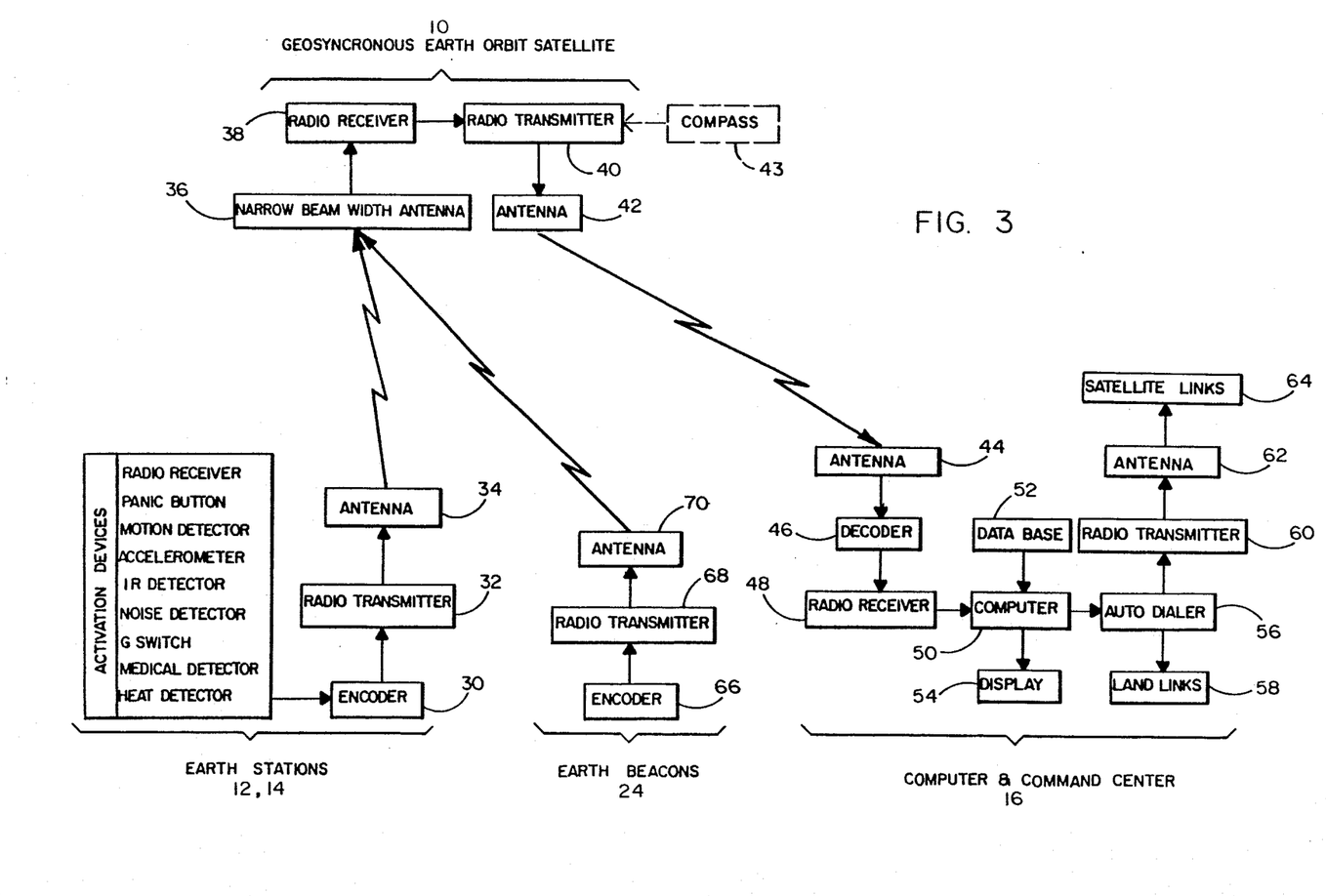
FIG. 3 is a block diagram of the present invention illustrating the major components thereof.

The major elements of the present invention are illustrated in block diagram form in FIG. 3. More specifically, as illustrated therein the sending unit or earth station 12 or 14 may be configured to respond to one or more alternative activation devices including by way of example, a radio receiver for remote initiation, a panic button for user initiation, a motion detector, accelerometer, infrared detector, noise detector or the like for determining unlawful intrusion into a vehicle, office, home or the like, a medical detector monitoring signs of patient distress indicating the need for immediate medical intervention, or a heat or smoke detector to monitor for fire and the like. Upon activation resulting from any of the aforementioned sources or others, an encoder 30 generates a unique pattern of data such as a serial binary bit pattern which identifies the sending unit by serial number and the type of emergency occurring or response desired so that an appropriate response can be made. The encoder 30 applies the encoded signal to a suitable radio transmitter 32 of selected frequency and power which is transmitted via antenna 34 to assure detection by the satellite 10 and location of the position of the sending unit in the manner hereinafter to be described.

As shown further in FIG. 3 the geosynchronous-orbiting satellite 10 comprises a narrow beamwidth antenna 36, a radio receiver 38, a radio transmitter 40 and an antenna 42. An optional compass 43 can also be provided as will be discussed hereinafter. Narrow beamwidth antenna 36 is utilized as the means for scanning the earth's surface as hereinafter described. The narrow beamwidth antenna 36 preferably generates an elongated pencil beam antenna pattern having a narrow beamwidth in one dimension in order to ensure easy correlation of scan position with peak signal strength detection and an elongated pattern in a second dimension to ensure detection. An elongated linear array of high gain antennas for radio frequency detection or such a linear array of infrared detectors for infrared detection are deemed appropriate. The antenna 36 is connected to a radio receiver 38 for re-transmission of the received signal by means of radio transmitter 40 and antenna 42. Thus, the geosynchronous earth orbiting satellite 10 is a simple receiving/transmitting satellite utilizing a narrow beamwidth antenna for scanning the visible face of the earth during each roll and yaw for re-transmission of any radio transmissions received by the satellite receiving system. As will be hereinafter explained more fully, satellite 10 has a unique orbit pattern combining in one preferred embodiment a 12 revolution per minute roll rate with a one revolution per minute yaw rate so that the combined effect is a differential scan of the face of the earth at angles suitable for triangulation on point source radiation transmissions.

The satellite 10 is provided with a downlink antenna 42 which re-transmits or relays the sending unit information to a ground station or computer and command center 16. The downlink signal is received by an antenna 44 the output of which is applied to a decoder 46 and radio receiver 48. The decoder 46 and radio receiver 48 process the encoded and relayed radio transmissions by decoding the signal originally encoded by the sending unit by means of encoder 30 and by analyzing the data imparted to the signal by the correlation of scan position, and peak signal reception at the satellite 10. A computer 50 keeps track of the roll and yaw rate of the satellite and by means of determining the point in the orbit where the sending unit peak signal is received, the computer determines the angle relative to true north or other reference in the orbit where the signal was received by the satellite.

In the preferred embodiment of the invention illustrated herein, during each yaw orbit 24 roll orbit signals are received from each point source of transmission and the computer triangulates on these to determine the location of the sending unit. Information encoded in the signal tells the computer the type of message that the sending unit is sending and dictates the appropriate response. Computer 50 searches a data base 52 to locate a street address or other identifying landmark nearest to the position of the sending unit as well as the location and phone number of the nearest emergency response center such as police station or hospital. The information found in the data base 52 may be displayed on a display 54. The computer is connected to an automatic dialer 56. Dialer 56 is provided with the capability for telephoning the emergency response center with a computerized voice synthesized notification of the emergency situation or alternatively a human operator may be utilized to describe the response best suited to handle the situation. The auto dialer 56 may be connected to a plurality of land links 58 or alternatively, to a radio transmitter 60 and an antenna 62 which communicate with a plurality of satellite links 64 to provide a direct satellite downlink to relay the emergency information to a suitable emergency response center.

The present invention contemplates two alternative means for providing information indicative of the scan position of the satellite 10. One such means comprises the use of earth beacons 24 illustrated in block diagram form in FIG. 3. Each such earth beacon comprises an encoder 66, a radio transmitter 68 and a suitable antenna 70. The earth beacons are located at known locations stored in the computer 50 at the ground station 16. Consequently, when the ground station 16 receives an encoded transmission indicative of an earth beacon, it can readily utilize the known precise location of the earth beacon to accurately determine the satellite scanning position at a precise time. As a result, the scanning pattern of the satellite 10 may be periodically determined or confirmed by means of such beacons. The encoder 66 of each such beacon generates an encoded signal identifying the particular beacon and thus indicating the precise location of such beacon. The encoded signal is transmitted to the satellite 10 by means of the radio transmitter 68 and antenna 70.

An alternative means for determining satellite scan position is a compass 43 shown in dotted box representation in FIG. 3 as a portion of the satellite 10. Compass 43 represents any one of a number of means for instantaneously determining the relative yaw and roll position of a satellite at any time such as by means of star location, star pattern identification, gyroscopes, infrared detection and other instrumentation.

Figure 4:
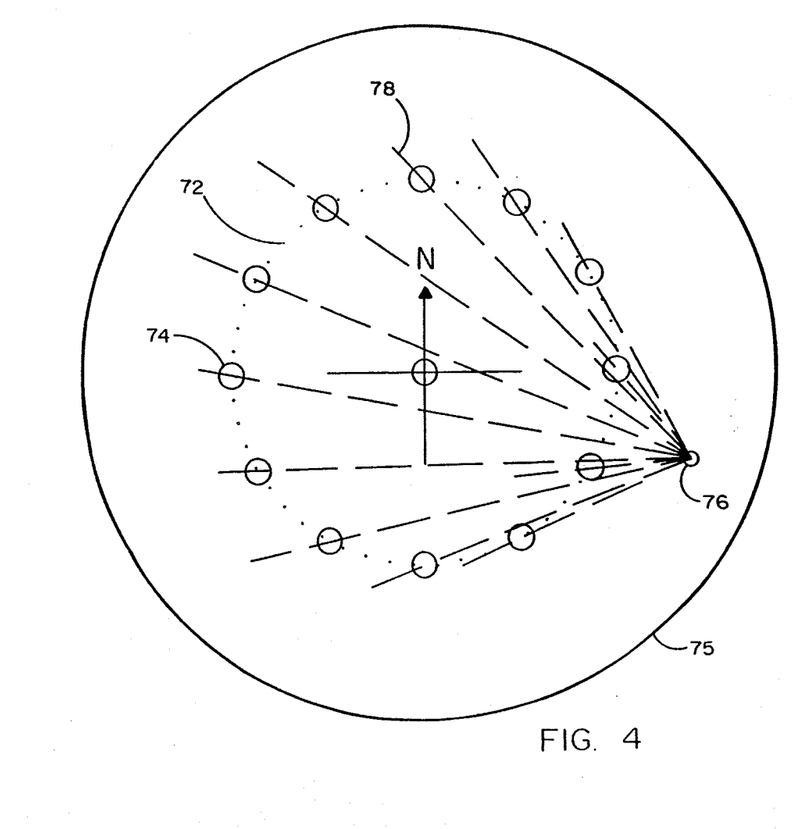
FIG. 4 illustrates the component paths of the yaw and roll search pattern employed by the platform of the present invention in an embodiment of a high earth geosynchronous orbiting satellite scanning the visible face of the earth for a signal from an earth-bound signal source.
Figure 5:
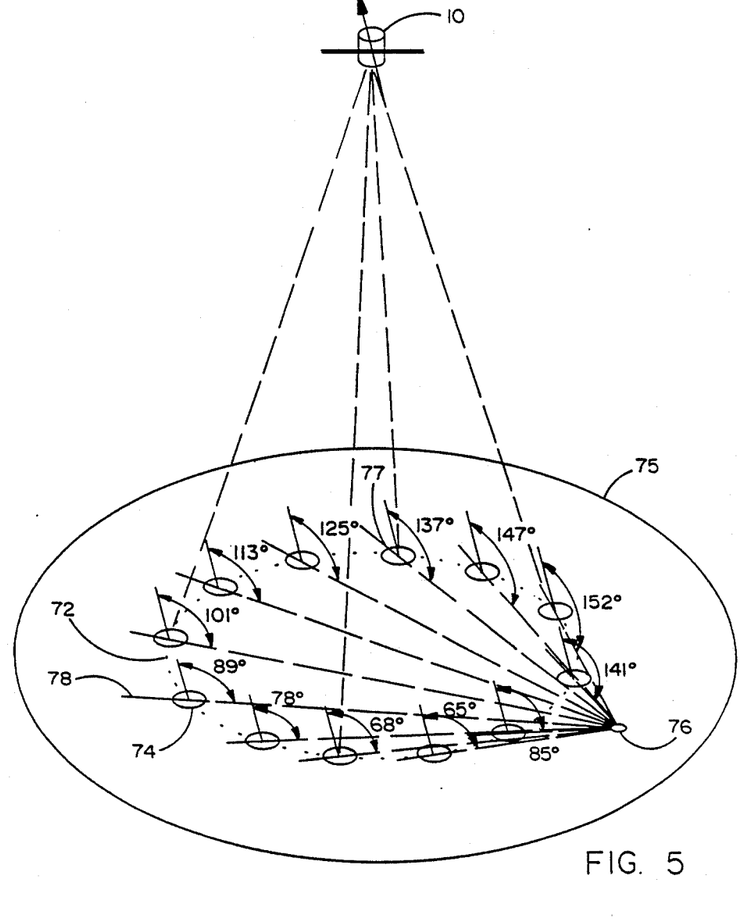
FIG. 5 graphically illustrates the tracking mode of the present invention at 30 degree yaw angle intervals in terms of roll angle from the satellite's true north reference.
Figure 6:
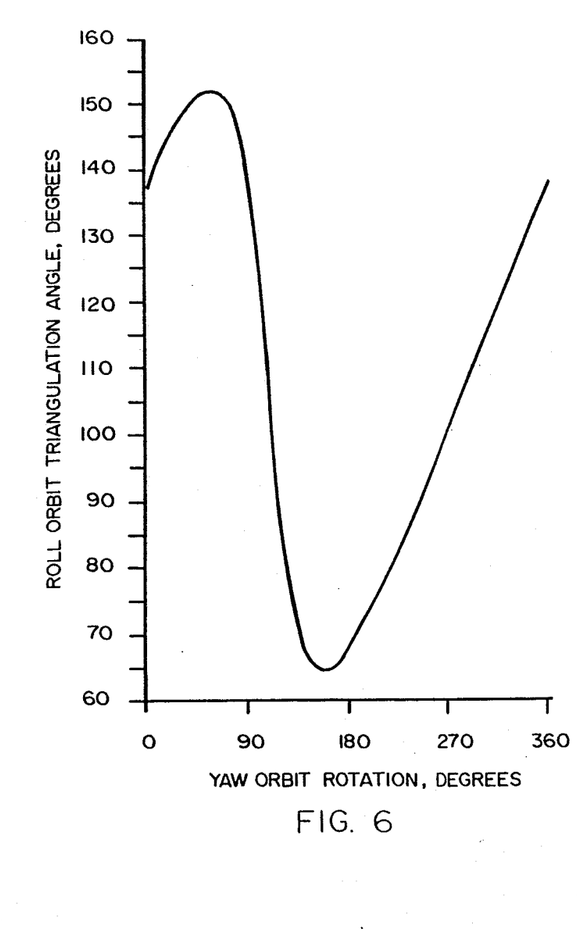
FIG. 6 is a representative trace of the peak signal strength roll and yaw angles on a selected frequency for the single target shown in FIG. 4.

The manner in which the satellite or other platform portion of the present invention may be used to locate a source of radiant energy within a preselected geometrical area on or near the face of the earth may be best understood by reference to FIGS. 4, 5 and 6 which shall now be discussed. More specifically, FIG. 4 illustrates the respective components of the composite scanning pattern employed by the present invention for scanning the visible face of the earth for a signal from a sending unit. For purposes of clarity, FIG. 4 illustrates a single target located outside the yaw orbit scan path. However, it will be understood that the present invention is neither limited to a single target nor to a single target located outside the yaw path of the scan pattern and that the invention detects the location of multiple targets as well as targets located both inside and outside the scan path projected onto the face of the earth.

In a typical application of a preferred embodiment of the invention wherein the satellite 10 is in a GEO stationary, or geosynchronous orbit above the earth's surface, the circle identified as 75 in FIG. 4 would represent a projection of the earth's surface subtended from the satellite location about 22,000 miles above. On such a projected surface the continuous yaw rotation of the satellite 10 or of the antenna portion thereof, produces a first path 72 which may be considered generically arcuate and specifically circular in the particular example illustrated in FIG. 4. It will be understood that the path 72 represents the intersection of an axis of a main beam of the narrow beamwidth antenna 36 of the satellite 10 with the earth's surface due to one component of the motion of the satellite or alternatively, the motion of the antenna.

The other component of the scanning pattern of the satellite 10 of the present invention is represented by a plurality of second arcuate or circular paths 74 of which in the particular example illustrated in FIG. 4 there are twelve spaced symmetrically along the first arcuate or circular path 72. Each such circle 74 represents the roll component of the pattern scanned along the axis of the main beam of the antenna 36 of the satellite 10. It will be understood that the combined effect of the paths 72 and 74 is a composite pattern in the form of an epicycloid or epitrochoid.

During each roll path 74 the occurrence of peak signal strength from a source is noted and that occurrence is correlated to the scanning line of the satellite narrow beamwidth antenna so that a single radius line of each such roll path 74 can be identified, that radius line effectively pointing toward the source of the radiation signal received by the satellite antenna. At least one such radius line is identified for each roll path 74 during the full excursion of the scanning pattern around the yaw path 72. In the particular example illustrated in FIG. 4 where there are twelve for each excursion of a yaw path 72 there will be twelve or twenty four such radii associated with each target such as single target 76 shown in FIG. 4 and the intersection of such radii will occur at the precise location of the target.

For purposes of explanation, it is convenient to identify each such radius or radial line by the angle between such radial line and the satellite's true north. Such angles for each of the radial lines of the particular example illustrated in FIG. 4 are shown in FIG. 5 wherein it is seen that the target acquisition roll angle for the particular target 76 illustrated in FIG. 5, varies from a minimum of approximately 65 degrees to a maximum of approximately 152 degrees assuming the target 76 remains stationary during the full minute it takes to complete the yaw orbit. The actual variation of roll orbit acquisition angle in degrees versus the position of the scan pattern in yaw orbit rotation in degrees is represented by the graph of FIG. 6. A zero degree yaw orbit orientation which corresponds to the roll orbit path 77, is oriented due north of the center of the earth's surface 75.

The curve in FIG. 6 represents the locus of points on respective roll orbit paths along one yaw orbit path through which peak signal generated radial lines pass towards their common intersection point at the target 76. It will be understood that although the number of roll orbits in one yaw orbit may affect the accuracy of determining the target location, for a given target 76 of FIG. 5, all points generated on roll orbits irrespective of the number of such roll orbits would fall somewhere on the curve of FIG. 6 depending on the yaw angle. Furthermore, the radial lines passing through such points would all intersect at the target 76.

Figure 7:
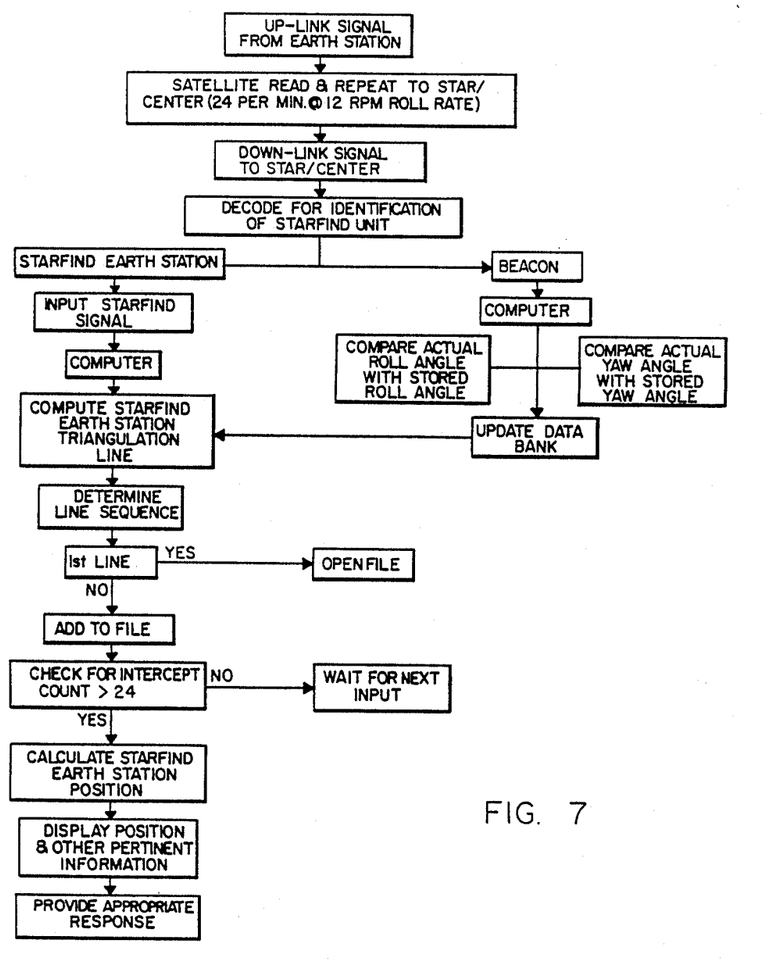
FIG. 7 is a block diagram of the operating sequence of the present invention when using an earth beacon or series of earth beacons to provide reference data correlating satellite roll and yaw orbit positions.
Figure 8:
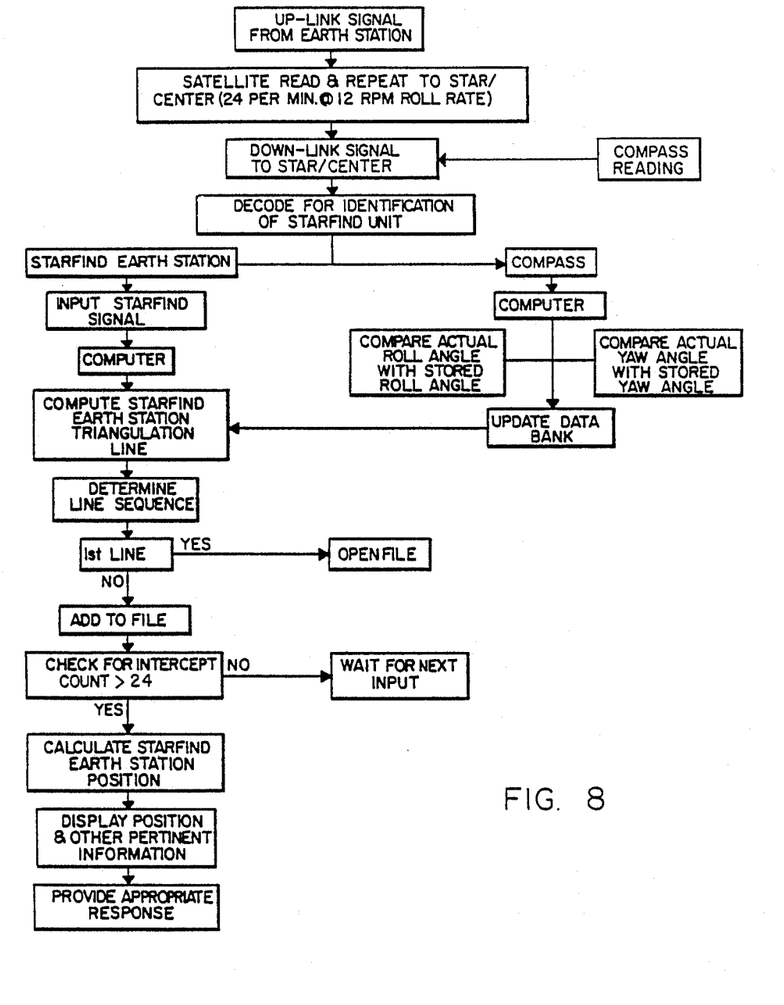
FIG. 8 is a block diagram of the operating sequence of the present invention utilizing an alternative method for assuring satellite roll and yaw orbit data accuracy based on on-board instrumentation obviating the requirement for earth bound beacons.

The process for providing location data used by the ground station of the present invention is illustrated in flow diagram form in FIGS. 7 and 8. FIGS. 7 and 8 illustrate virtually identical processes except for the use of a beacon in FIG. 7 to generate the yaw and roll angle data as compared to the use of a "compass" to generate that information in the process of FIG. 8. Accordingly, only one of such flow diagrams need be described herein. Referring to FIG. 7 therefore, it will be seen that in response to the uplink signal received from the satellite from a sending unit or earth station, the satellite reads and repeats the reading of the uplink signal twenty four times per minute assuming a twelve RPM roll rate. Each time the signal is read or re-read by the satellite it is transmitted or relayed down to the unitary earth station of the present invention where it is decoded for identification to determine what if any identifying information has been stored in the data base corresponding to the particular encoding of the sending unit, the signal of which has been received by the satellite.

The earth station functions include first inputting the relayed signal into the computer. The computer computes the sending unit's triangulation line by determining the satellite's roll and yaw angle at the occurrence of the peak signal detection for the particular roll path being processed. In the particular embodiment of the invention illustrated in FIG. 7, the roll and yaw information are at least updated by data derived from one or more earth beacons previously described in conjunction with FIG. 3. More specifically, if upon decoding of the earth station or sending unit code it is determined that the code corresponds to a beacon transmitter placed at a precisely known location within the region being scanned, the beacon signal is applied to the computer which compares the actual roll angle and yaw angle computed from the location of the beacon with the stored or assumed roll angle and yaw angle based upon prior such calculations. If in fact there is a difference between actual and stored roll and yaw angles, the computer's data bank is updated to correct for this discrepancy.

As previously indicated in the invention configuration illustrated in FIG. 8, the processing carried out by the computer is essentially the same, however the source of the updating information is derived from satellite-based instrumentation which has been generically referred to herein as a compass. In either case, the corrected roll and yaw angle information is applied to the computation process carried by the computer to determine the particular triangulation line corresponding to a detected peak of the sending unit signal for a particular roll orbit. The computer then determines line sequence. More specifically, it determines whether the calculated line is the first line received or a subsequent line. If it is the first line received then a file is opened and the computer waits for the next input. If it is not the first line, the computer determines whether the line count is greater than some specified minimum such as 24 lines. If it is not then the computer waits for the next input. If the line count is greater than the specified minimum then the position of the signal source is calculated by computing the line intercept location. The position and other identifying information related to the signal source are then displayed and the appropriate response to the situation is made such as notification of local police or other authorities.

There may be occasions when it is preferably to obviate the use of a command center or to preclude the need for an uplink transmitter at each locating position. A second embodiment of the invention makes these alternatives possible. More specifically, by providing a satellite-based transmitter which generates a signal carrying precise, real-time yaw and roll scanning data, a ground-based passive receiver can be used to calculate its own position. This can be accomplished by correlation of peak signal detection and yaw and roll data or multiple roll scans in substantially the same manner utilized in the command center of the first embodiment. The second embodiment is particularly advantageous to boaters and the like who may need to determine their precise location for navigation purposes. Although the ground-based system of the second embodiment need not have a transmitter, it will be preferably equipped with a calculator substantially equivalent for example to a Hewlet Packard Model 41C programmable calculator, for arriving at the precise location based on multiple correlations of the receiver. The calculator would carry out the algorithm of FIG. 8 with the decode and compass update steps eliminated.

The present invention may also be used to determine altitude. Previously, two satellites were required to determine the altitude of a target. By adding only to the computational aspects of the present invention, target altitude and position can be determined using a single satellite.

Figure 9:
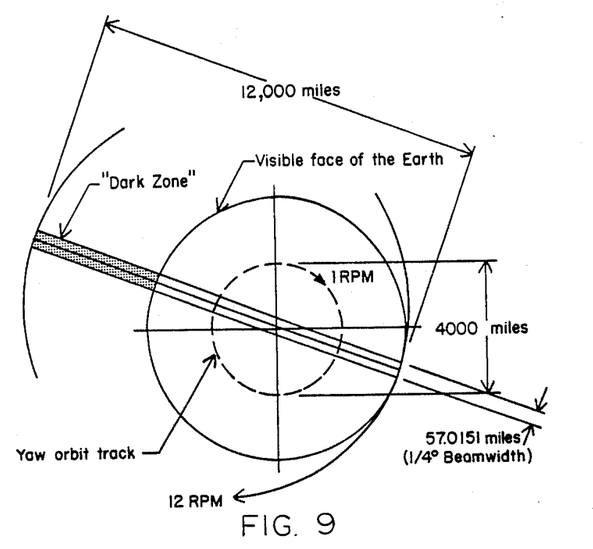
FIG. 9 represents the pattern of scanning on a "flat" earth by an elongated, narrow beamwidth antenna pattern.

FIG. 9 illustrates the plan view of the scan pattern as if looking at a flat earth. The yaw orbit projects a 4,000 mile diameter focus on the face of the earth and the roll orbit of the narrow beamwidth antenna projects a search pattern that is 12,000 miles long by 97.0191 miles wide (for a ¼ degree beamwidth at 22,235 mile geostationary placement). Starting from the upper left of FIG. 9 there is the "dark zone" of the search pattern which is the 4,000 mile long projection that points outside the face of the earth into outer space. The next 2,000 miles is active target seeking to the center of the roll orbit rotation point and the next 6,000 miles looks to the opposite edge of the earth.

Figure 10:
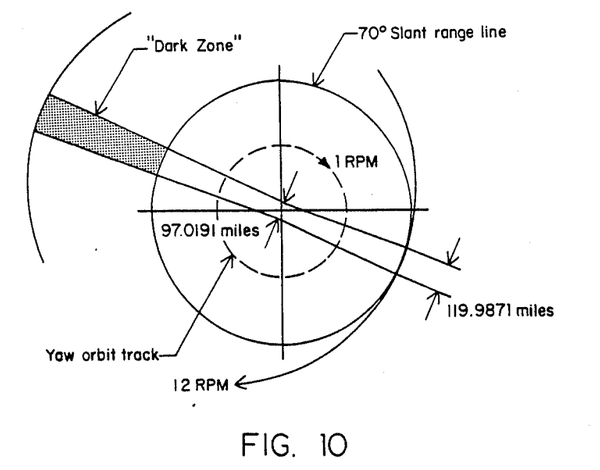
FIG. 10 is similar to FIG. 9 but including the curvature of the earth.

In FIG. 10 the curvature of the earth is added and it can be seen that the beamwidth varies from a minimum of 97.0191 miles on the equator directly beneath the satellite, to a maximum of 119.9871 miles at the extremes of the slant range (70 degrees north and south).

Figures 11, 12:
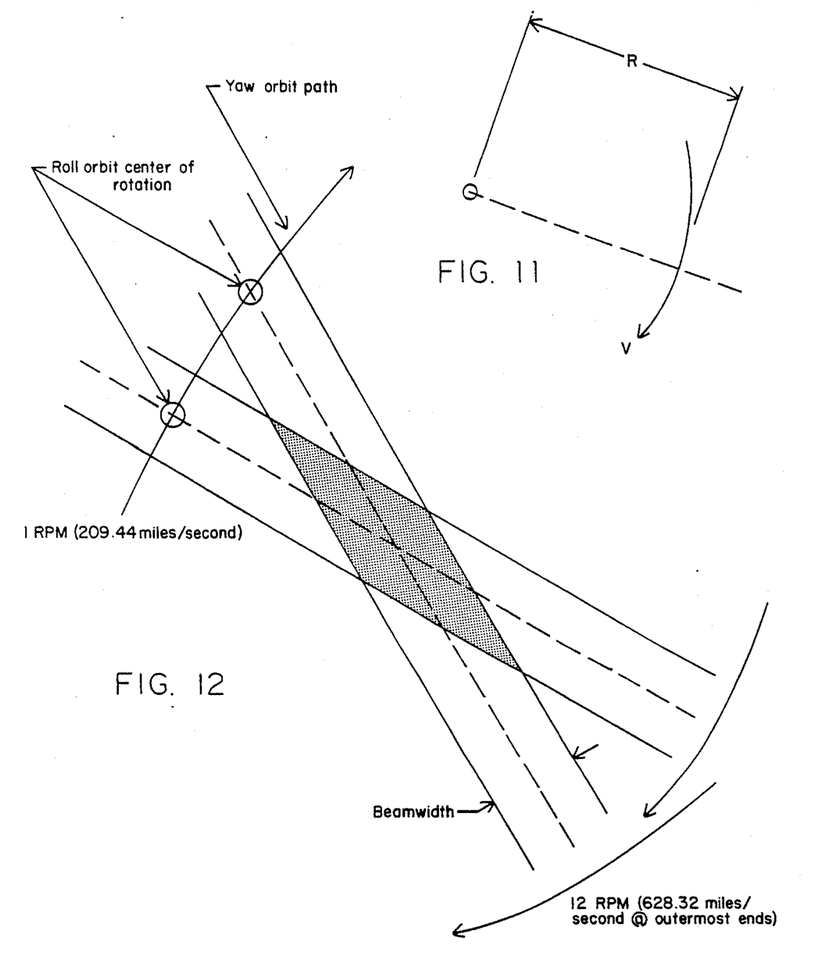
FIGS. 11 and 12 are used to illustrate the variation of beam velocity and the beam dimensions over the face of the earth.

FIG. 11 illustrates that the rotational velocity of the search beam over the face of the earth, increases with distance from the origin, or rotation center in roll orbit, of the narrow beamwidth antenna. This rotational velocity is computed from:

$$V = 2\pi R \times \text{RPM} \qquad \text{Eq 1}$$
$$= 2 \times \pi \times 6000 \times 12$$
$$= 452{,}389.3421 \text{ miles/minute (7539.822 miles/second) at extreme length of the beam projection.}$$

In FIG. 12 it can be seen that the length of time that the beam is actually over the target is a function of the distance of the target from the origin, or rotation center which can be expressed in terms of the rotational velocity, or:

$$T_{ot} \approx \frac{\text{Beamwidth}}{\left(\frac{2 \times \pi \times R \times \text{RPM}}{60}\right)} \qquad \text{Eq 2}$$

Figure 13:
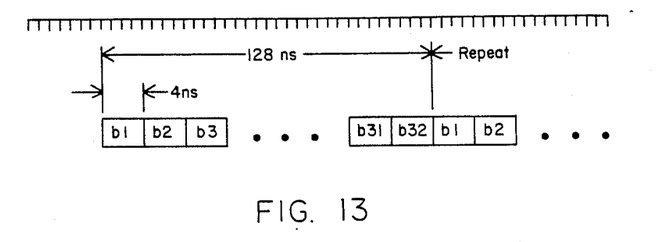
FIG. 13 illustrates the timing of a signal code that may be used in the invention.
Figure 14:
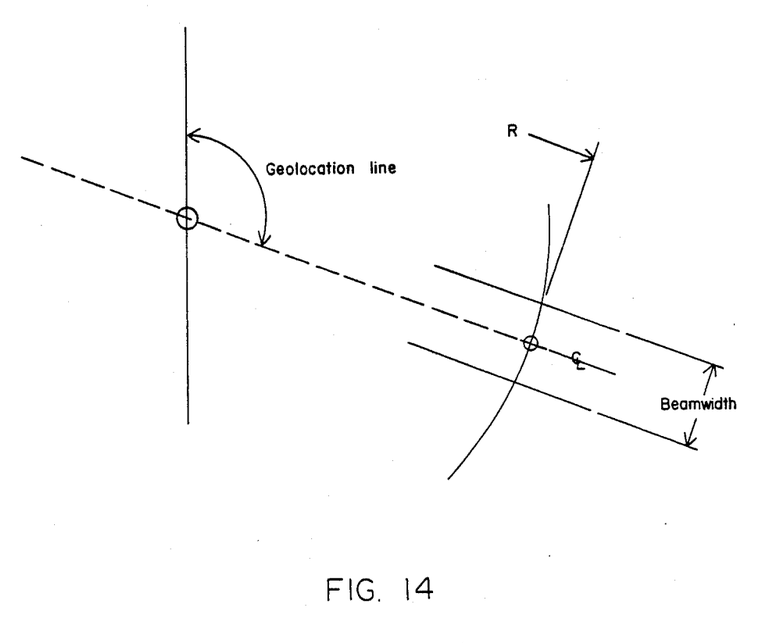
FIG. 14 illustrates the relationship between antenna beamwdith and target geolocation line.

FIG. 13 illustrates a typical bit code which may be used to identify a target. Each bit is 4 nanoseconds long and the total signal is 32 bits or 128 nanoseconds long, continually repeating as long as the target is active. With a large plurality of users it cannot be assumed that the first decoding of the target identifier is conincident with the actual first signal acquisition. Accordingly, as the composite signal is received, the computer adds a timing mark. When a particular signal is decoded it is then isolated backward and forward and compared with the timing mark so that first acquisition, last acquisition, length of time over target and center point are clearly defined. Combining and averaging these beam sharpening techniques, along with peak signal strength, yields the desired accuracy for determining beamwidth centerline relative to the target and thus the geolocation line (see FIG. 14).

In FIG. 11 it is shown that the rotational velocity of the projected pattern of the narrow beamwidth antenna varies linearly from zero at the origin to:

$$V = 2 \times \pi \times 6000 \times 12 \qquad \text{(from Eq 1)}$$
$$= 452{,}388.96 \text{ miles/minute at the extremes,}$$
$$\text{for the example of 12 RPM roll rate}$$

The time the antenna search pattern remains over the target varies from ∞ at the origin (instantaneous origin only since the rotation origin is always moving in the yaw orbit) to:

$$T_{ot} \approx \frac{108.5}{\left(\frac{2 \times \pi \times 6000 \times 12}{60}\right)} \qquad \text{Eq 3}$$
$$= .014390259 \text{ seconds at the extreme edges}$$

Figures 15, 16:
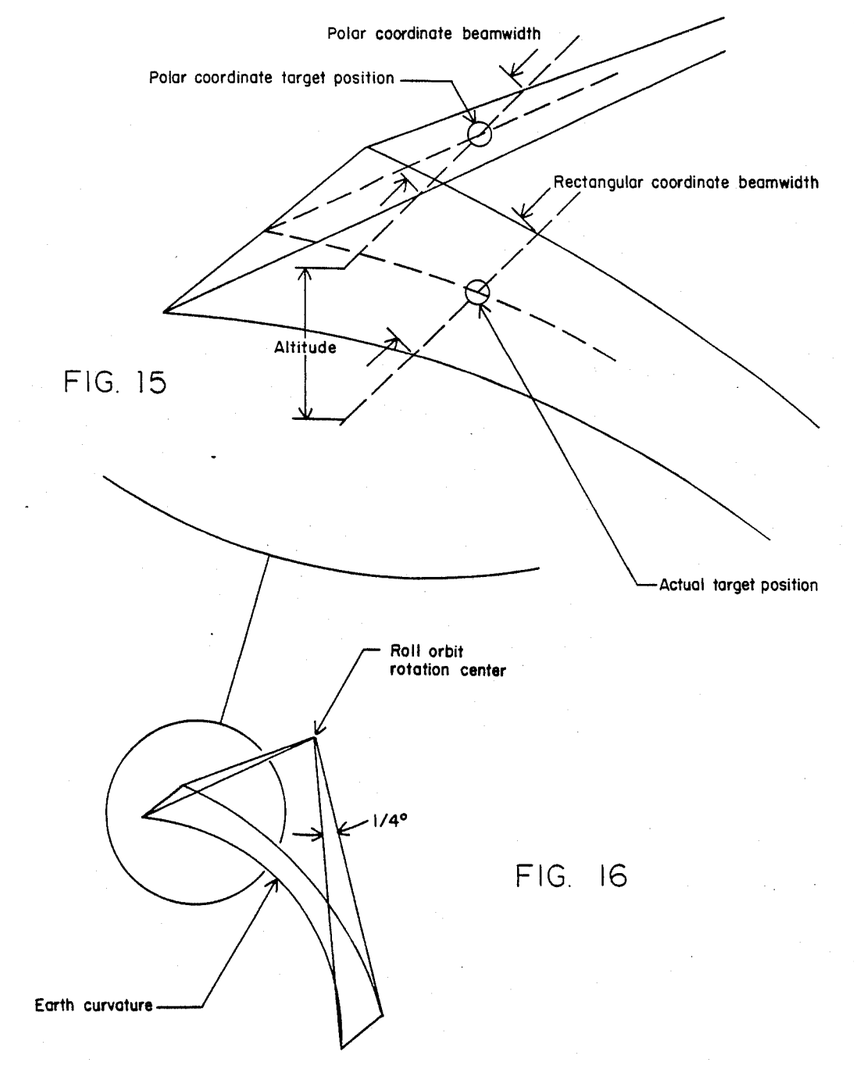
FIGS. 15 and 16 are differently scaled diagrams used to explain the calculation of altitude of a target by means of the present invention.

As represented by FIGS. 15 and 16, by assuming a set elevation, say sea level, on the first signal acquisition we can determine the approximate target location from the angle and radius in conventional polar coordinate form. Each subsequent target location then provides a geolocation line in rectangular coordinates as well as the polar coordinate location which is offset by the target altitude. The difference between the location provided by the rectangular coordinate system geolocation lines and the polar coordinate location determines the target location in three dimensions.

As an example, assume that a target is first acquired on the 30 degrees yaw/147 degrees roll scan. Also assume that the time over the target is 0.020317197 seconds and 158,728 bytes of signal are acquired during this time. From the relationship:

$$\text{Radius} = \frac{60 \times \text{Beamwidth}}{\frac{\text{Bit/Byte}}{\text{Rate}} \times \frac{\text{Number of Acquisitions}}{} \times 2\pi \times \frac{\text{Roll Rate}}{(\text{RPM})}} \qquad \text{Eq 4}$$
$$= \frac{60 \times 97.0191055}{128 \times 10^{-9} \times 158{,}728 \times 2\pi \times 12}$$
$$= 3800.002553 \text{ miles}$$

we locate the target, in polar coordinates at 30 degrees yaw, 147 degrees roll and 3800.002553 miles radius from the projected center of rotation.

Subsequent geolocation lines show the true position of the target is on the coast of Brazil at 2.16 degrees south of the equator. The beamwidth in this location is actually 97.04390773 miles. Each byte is 128 nanoseconds long and the rotational velocity at 3800.002553 miles is:

$$V = 2 \times \pi \times 3800.002553 \times 12$$
$$= 286{,}513.4425 \text{ miles/minute}$$
$$= 4775.224042 \text{ miles/second}$$

158,728 bytes were counted at a duration of 128 nanoseconds corresponding to a beamwidth (at altitude) of:

$$B_{w,\,alt} = V \times \text{Count} \times \text{Duration} \qquad \text{Eq 5}$$
$$= 4775.224042 \times 158728 \times 128 \times 10^{-9}$$
$$= 97.01910549 \text{ miles}$$

The difference is 97.04390773−97.01910549=0.024802237 miles giving us an altitude from the relationship:

Altitude = Delta Location Miles/Tangent (Beamwidth Angle)   Eq 6

$$= \frac{0.024802237}{\tan(1/4°)}$$

= 5.684217937 miles

= 30,012.67071 feet

From its unique identifier, the target may, for example, be a commercial jet aircraft enroute to Buenos Aires from the Azores. It is 12.7 feet above its assigned altitude of flight level 300 (30,000 feet), but within Air Traffic Control tolerances.

It will now be understood that what has been described herein is a novel and advantageous single-point locating system employing unique scanning patterns for generating peak signal data which can be used to calculate the position of a signal source within a scanned region in either two or three dimensions. A particular, preferred embodiment of the invention has been described herein. The preferred embodiment utilizes a satellite in high earth geosynchronous orbit. The satellite provides an elongated narrow beamwidth antenna pattern the center line of which is made to scan simultaneously in a yaw and roll pattern either by yaw and roll mechanical motion of the satellite, mechanical motion of the antenna or combined electrical and mechanical motion inducement of the antenna pattern in order to scan a substantial portion of the earth's surface. Although it is contemplated that in preferred embodiments the signal source located by means of the present invention would be a form of radio frequency or microwave electromagnetic radiation, virtually any form of radiant energy such as infrared, electromagnetic, light or acoustical energy may also be utilized in other embodiments of the invention. Furthermore, the scanning device of the present invention, that is, the platform upon which the scanning pattern is generated, may also be positioned in a low earth satellite, an aircraft, missile, a helicopter or other device. The locating system of the invention is capable of determining a target's position and altitude.

The single-point device re-radiates the signal source transmission or a manifestation thereof to a single ground-based computer/command center which correlates single-point device scanning position data with received transmissions to actually compute the location of the signal source based upon correlation of orbit data with peak signal detection data. Beacons may be placed at precisely known locations for periodically updating data corresponding to the yaw and roll angle of the satellite or other relay platform. The ground-based computer triangulates peak signals of multiple roll orbits generated during each yaw orbit of the single-point device to determine the precise location of the source. The computer may also search a data base to identify the signal source and provide related information previously stored in the data base. The invention is particularly advantageous for locating stolen vehicles and for finding kidnapped persons where in each case such vehicle or person is carrying a sending unit or earth station which is activated in response to a preselected condition such as unauthorized access to the vehicle or volitional activation of the earth station by a person being kidnapped or otherwise endangered.

Those having skill in the art to which the present invention pertains will now understand that there are virtually unlimited applications for the present invention. By way of example, the present invention may be readily used for navigational purposes for controlling the position and altitude of military and commercial aircraft in response to real time knowledge of their actual flight paths in either two or three dimensions. Furthermore, the embodiments of the present invention may have profound military applications by enabling the commander of a manned force or a ship force to have a real time representation of the precise location of each of his men or ships. The second embodiment provides this capability without requiring ground-based transmission. Furthermore, because the present invention is not limited to any particular type of radiant energy, it may also be used to detect and report the occurrence and location of an anomalous condition such as leaks in long pipe lines, or for example, forest fires where small fires can be detected early before they have had a chance to do more substantial damage.

The present invention has been described in sufficient detail to enable one skilled in the art to make and use the invention. Accordingly, specific details which are readily available in the art or otherwise conventional such as the frequency of radio transmissions between ground stations and earth satellites and the like, have been omitted to prevent obfuscation of the essential features of the invention. By way of example, the peak signal detector referred to herein although not specifically described, may be any one of a large number of conventional AM demodulation and detection circuits including by way of example, the circuit of FIG. 7 of U.S. Pat. No. 4,276,553 to which reference has been made previously. In view of the foregoing it will be understood that the present invention may be implemented in a variety of alternative ways using a variety of alternative processing methods, but that all such implementations and signal processing methods are deemed to be within the scope of the present invention which is to be limited only by the claims appended hereto.

I claim:

1. A locating system comprising:
 a source of radiation the position of which in a scanned region is to be determined;
 a relay device having means for scanning said region in a prescribed pattern, said pattern being the composite of a first circular path over said region and a plurality of second circular paths, said second circular paths being smaller than and spaced symmetrically along said first circular path, and means for determining the directions of respective straight lines between said source of radiation and one point on at least two of said second circular paths whereby the position of said source of radiation in said scanned region is determined by the intersection of said straight lines.

2. The locating system recited in claim 1 wherein said relay device comprises means for relaying a manifestation of the radiation of said source of radiation to said determining means.

3. The locating system recited in claim 2 wherein said determining means comprises a peak radiation detector and means for ascertaining from detection of peak radiation from said source of radiation, the point on each of said scanning second circular paths at which such peak radiation detection occurs.

4. The locating system recited in claim 3 wherein said radiation is electromagnetic.

5. The locating system recited in claim 3 wherein said radiation is infrared.

6. The locating system recited in claim 3 wherein said source of radiation comprises a radio transmitter.

7. The locating system recited in claim 6 wherein said radio transmitter generates an encoded signal indicative of the identity of the transmitter.

8. The locating system recited in claim 3 wherein said relay device comprises a radiation receiver and a transmitter.

9. The locating system recited in claim 3 wherein said relay device comprises an earth orbiting satellite.

10. The locating system recited in claim 3 wherein said relay device comprises a geosynchronous orbit satellite.

11. The locating system recited in claim 3 wherein said determining means comprises a programmed computer and wherein said locating system further comprises at least one radiation source positioned within said scanned region at a location known precisely by said computer whereby to enable selective calibration of said locating system.

12. The locating system recited in claim 3 wherein said source of radiation comprises means for selective activation in response to a predetermined event.

13. The locating system recited in claim 12 wherein said source of radiation is located in a vehicle and said predetermined event is unauthorized access to said vehicle.

14. The locating system recited in claim 12 wherein said source of radiation is located on a person and said predetermined event is endangerment of such person.

15. The locating system recited in claim 3 further comprising means for communicating the determined position of said source of radiation.

16. The locating system recited in claim 9 wherein said relay device further comprises an additional satellite for downlink communication with said determining means.

17. A system for ascertaining the location of an energy-radiating source within a defined geometrical area on the surface of the earth; the system comprising:
 an orbiting satellite positioned above said area, said satellite having means for detecting said radiation energy, means for scanning said area in a selected pattern, and means for re-radiating said radiant energy;
 said selected pattern comprising a composite of a first arcuate path over said area and a plurality of second arcuate paths along said first arcuate path; and
 an earth-based receiving apparatus having means for receiving said re-radiated radiant energy, means for ascertaining the direction of peak radiation from said source relative to a point on each such second arcuate path at which said scanning means is scanning respectively, when such peak radiation is detected by said detecting means, and means for calculating the intersection of said directions for locating said source.

18. The system recited in claim 17 wherein said scanning means comprises a narrow width antenna the main beam of which is directed toward said geometrical area and continuously moved in said selected pattern.

19. The system recited in claim 18 wherein said main beam is continuously moved by corresponding motion of said satellite.

20. The system recited in claim 19 wherein said motion of said satellite comprises approximately one revolution per minute in yaw to generate said first arcuate path and approximately twelve revolutions per minute in roll to generate said second arcuate paths.

21. The system recited in claim 18 wherein said main beam is continuously moved for scanning along said first arcuate path by corresponding motion of said satellite.

22. The system recited in claim 21 wherein said main beam is continuously moved for scanning along said second arcuate paths by mechanical roll motion of said antenna.

23. The system recited in claim 17 wherein said scanning means comprises an elongated longitudinal array of narrow beamwidth antennas forming an elongated, narrow scanning beam.

24. The system recited in claim 17 wherein said scanning means comprises an elongated longitudinal array of infrared detection devices.

25. A system for determining the precise physical location of a receiver within a defined geometrical area on the surface of the earth; the system comprising:
 an orbiting satellite positioned above said area, said satellite having means for scanning said area in a selected pattern while simultaneously transmitting a signal indicative of its instantaneous scan direction, said selected pattern comprising a composite of a first arcuate path over said area and a plurality of second arcuate paths along said first arcuate path; and
 a receiver for receiving said signal and means for ascertaining the direction of peak signal strength and correlating said directions with said scan direction relative to a point on each such second arcuate path, respectively, for calculating the intersection of said directions for locating said receiver within said area.

26. The locating system recited in claim 1 further comprising means for determining the position of said source of radiation in three dimensions.

27. The locating system recited in claim 1 further comprising means for determining the altitude of said source of radiation.

28. The system recited in claim 17 further comprising means for determining the position of said source in three dimensions.

29. The system recited in claim 17 further comprising means for determining the altitude of said source.

* * * * *